United States Patent [19]
Ott et al.

[11] 3,964,726
[45] June 22, 1976

[54] BOWLING BALL HOLE FONT

[76] Inventors: Norman D. Ott, 619 Cherry St., Lansing, Mich. 48933; Richard D. Foster, 4250 Pinch Highway, Potterville, Mich. 48876

[22] Filed: Mar. 27, 1974

[21] Appl. No.: 455,298

[52] U.S. Cl. ............................. 249/90; 264/313
[51] Int. Cl.² ......................................... B28B 7/00
[58] Field of Search .............. 249/205, 206, 187 R, 249/90; 144/2 H, 26, 310 R, 310 A, 309 R; 264/313

[56] References Cited
UNITED STATES PATENTS

| | | | |
|---|---|---|---|
| 2,915,782 | 12/1959 | James | 249/55 |
| 3,520,961 | 7/1970 | Suda et al. | 425/404 |
| 3,858,839 | 1/1975 | Bowman | 249/90 |

*Primary Examiner*—Francis S. Husar
*Assistant Examiner*—David S. Safran
*Attorney, Agent, or Firm*—Beaman & Beaman

[57] ABSTRACT

A font used during the plugging of bowling ball finger holes consisting of an annular member defining a chamber placed upon the bowling ball surface about the finger hole to be plugged. The font body includes a base having a concave supporting surface corresponding to the configuration of the bowling ball, and attachment means attach the font to the ball during use. The font is formed of an easily machinable material, such as synthetic plastic, and may be simultaneously machined from the ball during machining of the plugging compound and resurfacing of the ball.

2 Claims, 9 Drawing Figures

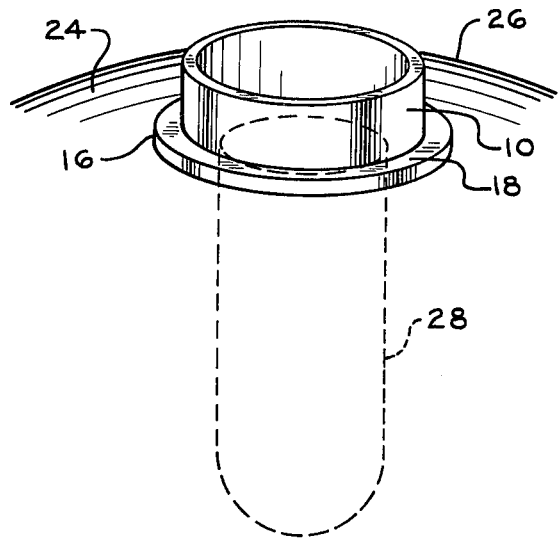
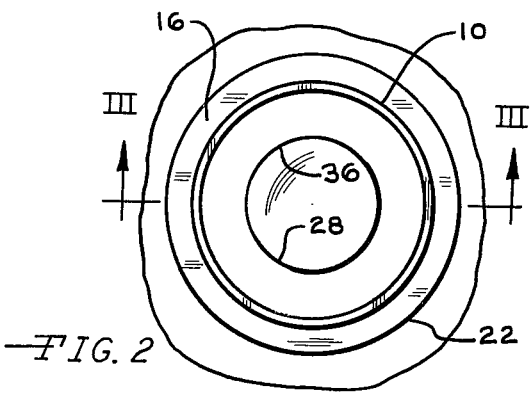
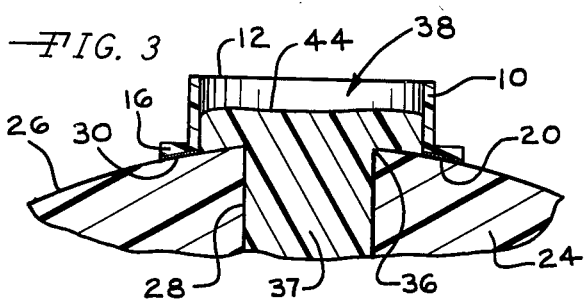
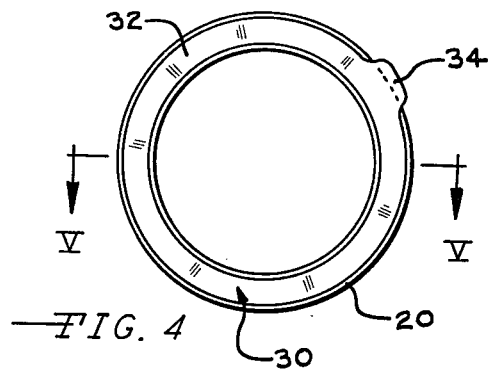
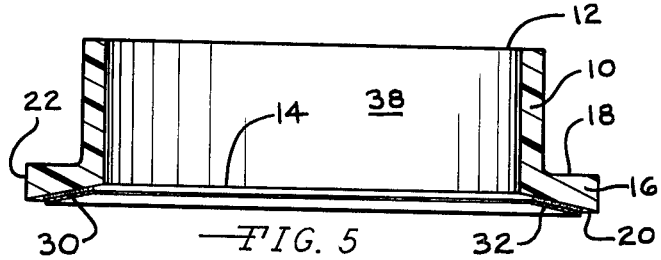
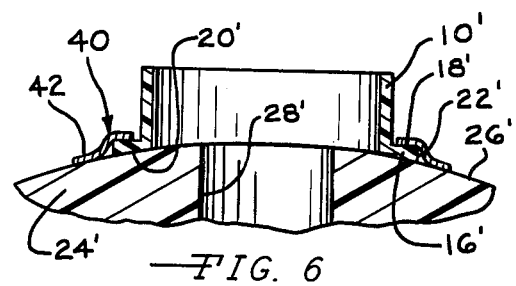
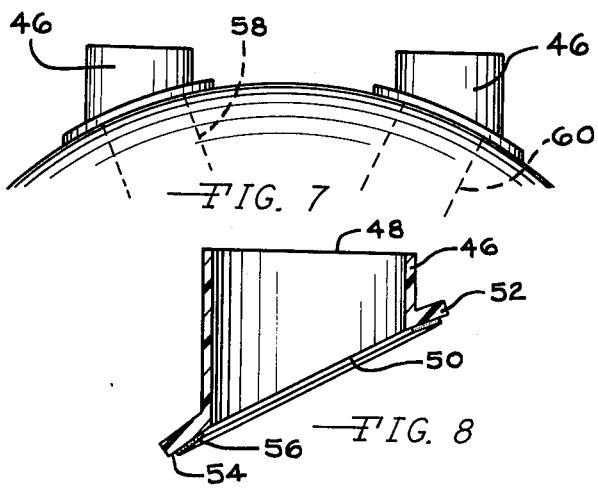
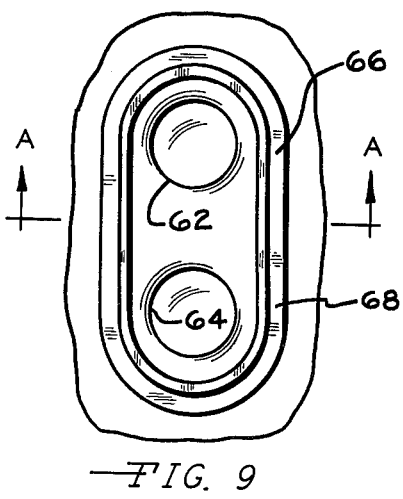

BOWLING BALL HOLE FONT

BACKGROUND OF THE INVENTION

The invention pertains to fonts used during the plugging of bowling ball finger holes.

Ten pin bowling balls are grasped by the bowler through the use of finger holes. Usually, three finger holes are employed for receiving the thumb and two middle fingers, but two finger hole balls are also used. As the spacing and the diameter of the finger holes are very important with respect to the "feel", comfort and control of the use of the ball, the bowler often desires to modify the finger hole spacing or diameter in order to improve his performance. Modification of a finger hole is achieved by filling the existing hole, or holes, with a plugging compound of a synthetic plastic material which hardens and firmly adheres within the finger hole to the ball. The hole is overfilled and the surface of the ball is machined to the desired spherical configuration, and new finger holes are drilled of the desired shape and at the desired location. Usually, in the redrilling of the finger holes, at least a portion of the plugging material is drilled in that the relocating, or resizing, of the hole is usually of a limited dimensional change.

The finger holes are plugged with a synthetic plastic resin material which is mixed with a catalyst and poured into the finger hole. The mixed plugging compound hardens and becomes integral with the ball. It is the practice to overfill the finger hole to insure that the finger hole is completely filled even though some shrinkage of the compound occurs whereby a truely spherical surface can be restored to the ball prior to redrilling. To overfill the finger hole it is necessary that the overfill be confined in that the consistency of the mixed plugging compound is quite viscous, comparable to syrup or heavy cream.

It has been the practice to confine the plugging compound overfill with a "dam" built around the finger hole by means of a moldable clay material. The usual practice is to manually form an annular ridge of clay on the ball surface around the hole to be filled, and this ridge forms a dam permitting the finger hole to be overfilled sufficiently to completely fill the finger hole. After the plugging compound has hardened a router is placed upon the ball and routs away the "excess" plugging compound radially extending beyond the surface of the ball. During the routing operation the clay dam is also routed, if it is not first broken away, and removed from the ball. After the routing operation the new finger hole is drilled at the location, and of the diameter desired.

The aforementioned procedure is commonly employed in the plugging and reboring of bowling ball finger holes, and it will be appreciated that the manual forming of the clay dam about the finger hole is time consuming, and haphazard, and the effectiveness of the dam depends upon the skill of the builder. Ball hole plugging compound is expensive, and if a dam of too large a diameter is formed, plugging compound is wasted. If the dam is not formed "high" enough sufficient compound may not be placed in the hole and in the dam sufficient to fill the entire area to be resurfaced. Also, if the dam is not carefully constructed it will leak, and the clay material of the dam is abrasive enough to dull the router cutter over a period of time. Further, using a clay dam it is difficult to fill and plug more than one hole at a time when the holes are adjacent.

SUMMARY OF THE INVENTION

It is an object of the invention to provide a bowling ball finger hole font used in the plugging of finger holes which may be easily and quickly attached to a bowling ball surface, requires a minimum amount of plugging compound for a given size finger hole, is economical to use, and provides consistent results.

A further object of the invention is to provide a font for use in the plugging of bowling ball finger holes which provides consistent results without dependence upon the skill or knowhow of the user.

Another object of the invention is to provide a font for bowling ball finger hole plugging wherein a plurality of finger holes may be simultaneously filled.

It is another object of the invention to provide a font for bowling ball finger hole plugging wherein the font is formed of a readily machinable material as to be readily removed by a router without unduly dulling the routing tool or producing excessive wear thereof.

In the practice of the invention the font consists of an annular body of a synthetic plastic material having an open lower end and an open upper end. The lower end of the body constitutes a base having a concave supporting surface of a radius substantially corresponding to the radius of a bowling ball. The body of the font is fitted upon the bowling ball circumscribing a finger hole, or holes, to be plugged. The body is attached to the bowling ball, preferably by adhesive means, as to be sealed thereto, and the plugging compound is poured into the font and the finger hole to overflow the finger hole, and partially fill the font.

After the plugging compound has hardened the font and the plugging compound is machined from the surface of the ball restoring the hole area to a spherical configuration corresponding to the ball surface, and the ball is redrilled.

In the preferable form of the invention the adhesive used to attach the font body to the bowling ball is affixed to the concave base supporting surface. In a disclosed embodiment of the invention an adhesive tape or ring may also be disposed over the base flange for attaching the font to the ball. It is also considered within the scope of the invention to attach the font to the ball by various types of clamps.

Embodiments of the invention are disclosed wherein the supporting base and surface of the font generally lie in the plane obliquely disposed to the axis of the body whereby finger holes may be simultaneously filled, even though the holes are not axially vertically oriented. Also, an embodiment is disclosed whereby two finger holes may be simultaneously filled by using a single font.

BRIEF DESCRIPTION OF THE DRAWINGS

The aforementiond objects and advantages of the invention will be appreciated from the following description and accompany drawings wherein:

FIG. 1 is a perspective view of a bowling ball font in accord with the invention as located upon a bowling ball, FIG. 2 is a detail top plan elevational view of the font as taken from FIG. 1, FIG. 3 is a detail, elevational, sectional view of the font and ball after filling with plugging compound and prior to machining as taken along section III—III of FIG. 2, FIG. 4 is an underside view of the font prior to removing the adhesive protection ring, FIG. 5 is an elevational, sectional view of the font as taken along section V—V of FIG. 4, FIG. 6 is an elevational, detail, diametrical, sectional view of a font as mounted upon a bowling ball prior to insertion of the plugging compound, illustrating a variation in the means for holding the font on the ball, FIG. 7 is an elevational view of a bowling ball illustrating two fonts of modified form located upon the ball surface, FIG. 8 is a diametrical, elevational, sectional view of the type of font shown in FIG. 7, and FIG. 9 is a top plan view of a font used to simultaneously fill adjacent finger holes.

DESCRIPTION OF THE PREFERRED EMBODIMENTS

The preferred form of the invention is shown in FIGS. 1 through 5. In this form it will be appreciated that the font consists of a generally cylindrical body 10 having an open upper end 12, and an open lower end 14. The ends are of an annular configuration, and adjacent the lower end 14 a radially extending flange 16 is formed having an upper surface 18, and a lower font supporting surface 20. The flange also includes a circular periphery 22.

The supporting surface 20 is of a concave radiused configuration having a radius substantially equal to that of a conventional ten pin bowling ball 24 whereby when the font is placed upon a bowling ball surface 26 the surface 20 closely corresponds to the ball surface as apparent in FIG. 3, whereby the surface forms a sealed relationship to the ball surface.

In use, the font is attached to the ball during plugging of a finger hole 28 radially defined in the ball 24. It is within the scope of the invention to attach the font to the ball by clamping means, if desired, which may extend about the ball circumference. However, the preferred means for attaching the font to the ball is to apply an adhesive to the font supporting surface 20 which is capable of adhering to the ball surface, and such adhesive simultaneously serves as the font attachment means, as well as provides a seal between the font and the ball.

As shown in FIG. 5, an adhesive ring 30 is defined on the font supporting surface 20 forming a continuous annular configuration. Preferably, the adhesive 30 is of the pressure sensitive type, and during manufacture of the font a protective backing or cover ring 32, FIG. 4, having a tab 34, is attached to the exposed surface of the adhesive which may be peeled from the adhesive immediately prior to attaching the font to the ball 24. The protective ring 32 is formed with the conventional coated surface permitting the ring to only slightly adhere to the adhesive and be readily peeled therefrom without disturbing the relationship of the adhesive to the supporting surface 20.

The adhesive 30 may be formed from a double coated tape of the pressure sensitive type such as that sold by Morgan Adhesives Company of Stow, Ohio, identified as MACBOND No. 9546 double coate, pressure sensitive. In using a double coated tape of this type one side of the adhesive ring is affixed to the support surface 20, and the backing paper ring 32 and tab 34 are retained on the exposed adhesive surface until immediately prior to affixing the font to the bowling ball.

In use, the finger hole to be plugged is usually predrilled or countersunk to eliminate the radiused hole edge and then the bowling ball 24 is oriented such that the axis of the hole 28 is substantially vertically disposed. Thereupon, the backing paper ring 32 of a font is removed by grasping the tab 34, and the font is placed upon the ball surface 26 substantially concentric to the hole 28. By firmly pushing the font onto the ball an effective mechanical interconnection between the font and ball is achieved, and the adhesive also forms an effective liquid seal.

As the diameters of bowling ball finger holes substantially vary, fonts constructed in accord with the invention are provided of various sizes to permit the most economical use of the plugging compound, and in the commercial embodiment of the invention fonts having internal diameters of approximately 1 inch, 1 ¼ inch and 1 ½ inch are provided. The diameter of the font employed is determined by the diameter of the finger hole at the hole edge 36, FIG. 3.

After the font is in place the plugging compound 37 of a conventional composition consisting of a resin and catalyst, mixed, is poured into the finger hole 28 through the open upper end 12 of the font. The plugging compound is quite viscous, comparable to that of a syrup of thick cream, and the hole is filled, and overfilled to some extent as shown in FIG. 3. The overfilling into the chamber 38 defined by the cylindrical wall of the font allows for any shrinkage that may occur during hardening.

After the plugging compound has fully set and hardened a conventional bowling ball router is placed on the ball and the router is moved about on the ball to remove the font, and compound extending beyond the ball surface 26 so that the plugging compound within the hole 28 conforms to ball surface 26. As the font is formed of a readily machinable material, such as synthetic plastic, the font offers little resistance to the router cutter and thus does not adversely wear the cutter edge. After routing has been completed the area adjacent the plugged hole will be spherical conforming to the configuration of the rest of the ball, and the ball may be redrilled as desired to relocate or resize the finger hole, or both.

A variation in the type of adhesive means employed with the font is shown in FIG. 6. In this figure components identical to those previously described are represented by primed reference numerals. In this embodiment an adhesive ring or tape 40, which may be of annular configuration, is pressed upon the upper surface 18' of the flange 16', rather than being located upon the supporting surface 20'. The adhesive ring 40 may be of the pressure sensitive type, and is placed upon the flange 16' after the font has been located about the finger hole 28' to be filled. The ring 40 is of sufficient radial dimension that the outer portion 42 may be depressed down over the flange periphery 22' and engage the ball surface 26', as illustrated. In this manner the font is firmly affixed to the ball, and the adhesive ring 40 will function as a seal to retain any plugging compound which may leak under the supporting surface 20'. It will be appreciated that tape 40 could consist of a plurality of short linear tape strips, rather than a continuous ring.

As described above, the finger hole to be filled is usually located during filling such that the hole axis is vertically oriented. Such vertical orientation is desirable in that the viscosity of the liquid plugging compound causes the upper surface 44 of the compound to level itself, and if the axis of the finger hole is not substantially vertical, it is possible that the compound would flow over the upper end 12 of the font, and possibly not cover all of the area adjacent the finger hole.

It is often desired that the thumb and one or two finger holes are to be plugged, and in such instance, when using the font in accord with the embodiment of FIGS. 1 through 6, it will be necessary to vertically orient a hole, fill with plugging compound, and permit sufficient hardening to prevent overflow, prior to filling the remaining holes. Thus, it will be appreciated that such sequential operation is very time consuming, and adds to the cost of the plugging operation. The time required for such sequential operation is considerable in that several hours are usually required before most plugging compounds sufficiently set to prevent flowing.

An embodiment of the invention is shown in FIGS. 7 and 8 which permits the simultaneous plugging of several finger holes. The font in accord with these embodiments consists of an annular tubular body 46 having an open upper end 48 and an open lower end 50, and as represented in FIGS. 7 and 8 the longitudinal axis of the body 46 is vertically disposed. The base flange 52 homogeneously defined upon the body 46 generally lies in a plane obliquely disposed to the axis of the body, FIG. 8, and the base flange is provided with a concave supporting surface 54 corresponding to the ball radius, and an adhesive ring 56, identical to the embodiment of FIGS. 1 through 5.

The oblique orientation of the base and base surface relative to the body 46 permits the font to be employed with a finger hole not vertically oriented during plugging, as will be appreciated from FIG. 7. The font is mounted upon the ball in a manner identical to the font of FIGS. 1 through 8, and the plugging compound is poured through the font into the finger hole. As appreciated from FIG. 7, the finger holes 58 and 60 are obliquely related to the vertical, yet the configuration of the font permits the font to effectively retain a sufficient amount of plugging compound to completely cover the region of the finger hole adjacent the ball surface. While the use of this configuration of font requires more filling compound than the embodiment of FIGS. 1 through 5, this added coat is offset by the time saved when filling a plurality of finger holes, and it will be appreciated that when using the font of FIGS. 7 and 8, a plurality of fonts are simultaneously employed so that all of the finger holes may be simultaneously filled with plugging compound.

A font having the configuration shown in FIG. 9 is employed when both adjacent finger holes are to be simultaneously plugged. The font of FIG. 9 is an oval configuration when viewed from the top, so as to provide a chamber for receiving the overflow of plugging compound large enough to accommodate both finger holes 62 and 64.

The configuration of the embodiment of the font body 66 of FIG. 9, except for the oval form, is identical to either the embodiments 1 through 6, or 7 and 8. The font includes a base flange 68 having a supporting surface corresponding to the spherical configuration of the bowling ball surface. A section taken along A—A of FIG. 9 would appear identical to FIG. 5 if a font configuration having a base lying in a plane substantially perpendicular to the axis of the font body 66 is desired, as used for only plugging both finger holes simultaneously, or as is the usual case, if the font is to be of a configuration for simultaneous use with filling both finger holes, and the thumb hole, the base flange 68 will lie in a general plane obliquely disposed to the axis of the font body, and a sectional view identical to FIG. 8 would result as taken along A—A.

While the described font embodiment is intended for a single use, and is destroyed by the router, it is also to be understood that the font could be reusable, and could be formed of a more permanent material such as metal. In such instance the internal diameter of the font body would preferably be provided with a draft angle to facilitate removal from the hardened plugging compound, and a ball encircling clamp may be used to hold the font in place. Such a clamp may take the form of an elastomer band, and a gasket may be located on the surface 20 to improve sealing.

It will therefore be appreciated that in accord with the inventive concept a font for use in the plugging of bowling ball finger holes is provided which is of economical construction, requires no special skills on the part of the operator in use, is readily machinable and removable from the bowling ball, and may be readily employed with conventional bowling ball machining techniques and apparatus.

It is appreciated that modifications to the inventive concept may be apparent to those skilled in the art without departing from the spirit and scope of the invention.

We claim:

1. A font for use in the plugging of bowling ball finger holes comprising a circular annular body formed of an easily machinable rigid material having first and second open ends, a radially outwardly extending flange defined on said first end defining a base, said second end defining an opening having a diameter equal substantially to the inner diameter of said body, a concave spherical supporting surface defined upon said base having a configuration conforming to the surface of a bowling ball and adhesive means mounted upon said base for affixing said body to a bowling ball surface.

2. In a font for use in the plugging of bowling ball finger holes as in claim 1 wherein said adhesive means comprises an adhesive affixed to said supporting surface.

* * * * *